United States Patent
Saito et al.

(10) Patent No.: US 8,257,856 B2
(45) Date of Patent: Sep. 4, 2012

(54) VALVE-REGULATED LEAD-ACID BATTERY AND PRODUCTION METHOD THEREOF

(75) Inventors: Kazuma Saito, Kyoto (JP); Kenji Hirakawa, Kyoto (JP)

(73) Assignee: GS Yuasa International Ltd., Kyoto-Shi (JP)

( * ) Notice: Subject to any disclaimer, the term of this patent is extended or adjusted under 35 U.S.C. 154(b) by 702 days.

(21) Appl. No.: 12/071,195

(22) Filed: Feb. 19, 2008

(65) Prior Publication Data

US 2008/0199769 A1    Aug. 21, 2008

(30) Foreign Application Priority Data

Feb. 16, 2007 (JP) ................. 2007-036136

(51) Int. Cl.
*H01M 2/14* (2006.01)
(52) U.S. Cl. .......................... 429/142; 429/188
(58) Field of Classification Search .............. 429/300, 429/252, 204; *H01M 10/08*
See application file for complete search history.

(56) References Cited

U.S. PATENT DOCUMENTS

| | | | | |
|---|---|---|---|---|
| 3,867,304 A | * | 2/1975 | Mindick et al. | 516/84 |
| 2002/0192562 A1 | * | 12/2002 | Ferreira et al. | 429/300 |
| 2005/0042512 A1 | * | 2/2005 | Ferreira et al. | 429/204 |

FOREIGN PATENT DOCUMENTS

| | | |
|---|---|---|
| JP | S58-028178 | 2/1983 |
| JP | S62-126565 | 6/1987 |
| JP | S62-223988 | 10/1987 |
| JP | S63-221564 | 9/1988 |
| JP | H06-096793 | 4/1994 |
| JP | H06-188025 | 7/1994 |
| JP | 07-302610 | 11/1995 |
| JP | 2002-260714 | 9/2002 |
| JP | 2006-310274 | 11/2009 |

OTHER PUBLICATIONS

Notice of Rejection for Japanese Patent Application No. 2007-036136 dated Jul. 3, 2012.

* cited by examiner

*Primary Examiner* — Ula C Ruddock
*Assistant Examiner* — Daniel Gatewood
(74) *Attorney, Agent, or Firm* — Manabu Kanesaka

(57) ABSTRACT

To improve the penetration short-circuit resistance of a valve-regulated lead-acid battery. A mixed and scooped mat of glass fibers and organic fibers is used as a separator 3 of a battery comprising an electrode plate pack 4 obtained by inserting the separator 3 between a positive electrode plate 2 and a negative electrode plate 1 and housed in a container 5 and an electrolyte retained in the electrode plate pack 4 and the separator 3, wherein the separator is a mixed and scooped mat of glass fibers and organic fibers and the electrolyte is silica sol mixed with silica and silica sol is injected as the electrolyte.

4 Claims, 2 Drawing Sheets

VALVE-REGULATED LEAD-ACID BATTERY AND PRODUCTION METHOD THEREOF

BACKGROUND OF THE INVENTION

1. Field of the Invention

The present invention relates to a valve-regulated lead-acid battery and its production method, and more particularly to a valve-regulated lead-acid battery capable of contributing to improvement of penetration short-circuiting resistance and its production method.

2. Description of the Related Art

A valve-regulated lead-acid battery is designed to be tightly closed in a way to absorb oxygen gas generated in a positive electrode and to reduce to water at the time of charging in a negative electrode, and has characteristics that the battery does not require water supplementation and that the battery can be used in any posture and there are those known as the retainer type in which an electrolyte is retained in a retaining body just like a fine glass mat made of glass fibers with a mean fiber diameter of 1 µm or less and those known as the gel type in which an electrolyte is gelled. Although having a problem that retaining body just like a fine glass mat for retaining an electrolyte is costly, the retainer type ones tend to become popular in terms of exhibition of excellent effect for suppressing solution loss at the time of overcharging.

In recent years, the above-mentioned retainer type valve-regulated lead-acid battery has problems of cost down and high power output and with respect to the problem of cost down, grids of positive and negative electrode plates are produced in an expanding method to improve the productivity and with respect to the problem of high power output, the retaining body just like a fine glass mat is made thin to suppress voltage drop at the time of high power output. However, since the above-mentioned retaining body just like a fine glass mat has a low physical strength, in the case it is inserted between the positive and negative electrode plates using the grids produced in an expanding method, and it is affected by growth and deformation of the electrode plates, particularly of the positive electrode plate, the retaining body is broken and causes a problem of short-circuiting between the positive and negative electrode plates. To deal with that, it is tried to improve the physical strength of the above-mentioned retaining body by making the retaining body a mixed and scooped body of glass fibers and organic fibers.

On the other hand, with respect to the problem of high power output, the retaining body has to be durable to repeat of deep discharge, however in the case of using the mixed and scooped body of glass fibers and organic fibers, the valve-regulated lead-acid battery causes a problem that lead tends to be ionized and flow out of electrode plates when the concentration of the electrolyte in the retaining body is decreased by deep discharge, and accordingly eluted lead grows to be needle-like crystal at the time of next charging and penetrates the retaining body to result in penetration short-circuiting (dendrite short). It is supposedly attributed to that the mixed and scooped body of glass fibers and organic fibers is not being wetted evenly with the electrolyte because of an inferior solution retaining property as compared with that of a retaining body made glass fibers alone and a variety of means for improving the problem have been pursued (see Japanese Patent Application Laid-Open Nos. (JP-A) 2002-313305 and 7-29560).

JP-A 2002-313305 described above discloses a separator for lead-acid batteries containing glass fibers and organic fibers whose surfaces are coated with an inorganic oxide such as silica and aims to improve the strength without decreasing hydrophilicity and prevent fracture of the separator and penetration contact of electrodes even if the separator is made thin. Further, JP-A 7-29560 described above discloses a separator for sealed type lead-acid batteries obtained by mixing and scooping glass fibers, silica powder, and silica sol and aims to prevent the pressing power of the separator containing mainly glass fibers to the electrode plates from decreasing by reason of absorbing electrolyte, by mixing and scooping glass fibers with silica powder and silica sol in combination, as compared with the separator containing mainly glass fibers even if it absorbs the electrolyte.

It is reported that the separator disclosed in JP-A 2002-313305 described above can improve the short-circuit resistance and also improve hydrophilicity, however disclosed in Examples are only performance of separators obtained by laminating glass fiber mats and nonwoven fabrics of silica-coated polyolefin fibers (organic fibers), and in the case where such separators are used actually for valve-regulated lead-acid batteries and subjected to repeat test of deep discharge under conditions of practical use, whether the separators contribute to the improvement of the short-circuit resistance, or even if contributed to the improvement of the short-circuit resistance, whether the discharge capacity is sufficient or not is not disclosed at all. Further, with respect to the separators of JP-A 7-29560 described above, it is disclosed that glass fibers, silica powder, and silica sol are mixed and scooped to form gel which can contribute to retention of pressing power, and although the formation of the gel is a main point, it is not at all disclosed how the gel can be produced by adding glass fibers and silica powder to silica sol and mixing and scooping the mixture.

As described, even if a person skilled in the art can conceive of increase of short-circuit resistance owing to improvement of the hydrophilicity and contribution to improvement of the cycle life of the valve-regulated lead-acid batteries by retention of the pressing power owing to gel formation in the case of using the separators disclosed in JP-A 2002-313305 and 7-29560 described above, these patent documents do not suggest how to materialize the separators without hindering the productivity improvement during the valve-regulated lead-acid battery production process and it may be said that these patent documents do not contain such conception.

SUMMARY OF THE INVENTION

An object of the present invention is to solve the problems which JP-A 2002-313305 and 7-29560 described above do not conceptually include.

In consideration of the above-mentioned problems, the invention provides a valve-regulated lead-acid battery containing an electrode plate pack obtained by inserting a separator between positive and negative electrode plates and housed in a container and an electrolyte retained in the electrode plate pack and the separator, wherein the separator is a mixed and scooped mat of glass fibers and organic fibers and the electrolyte is silica sol mixed with silica (claim 1), and characterized in that the organic fibers contain at least one of acrylic fibers, polyester fibers, and olefin fibers (claim 2), and characterized in that the mixed and scooped mat contains at least 60% by mass of glass fibers (claim 3), and characterized in that the addition amount of silica is 1% by mass or more and 3% by mass or less on the basis of the mass of the electrolyte (claim 4). Further, the invention provides a production method for producing the above-mentioned valve-regulated lead-acid battery containing an electrode plate pack obtained by inserting a separator between positive and negative electrode plates and housed in a container and an electrolyte retained in the electrode plate pack and the separator, wherein silica in an amount of 1% by mass or more and 3% by mass or less on the basis of the mass of the electrolyte is added to the electrolyte to be poured into the container at the time of case formation (claim 5).

Furthermore "a mixed mat of glass fibers and organic fibers" of claim 1 means a mixed and scooped mat of glass fibers and organic fibers.

According to the present invention, silica is added to an electrolyte to be poured into a container at the time of case formation to form silica sol, so that with no need of considerable change of the production process, a separator made of a mixed and scooped mat of glass fibers and organic fibers can be evenly impregnated with the electrolyte, and accordingly, it can contribute to improve the short-circuit resistance and cycle life property of a valve-regulated lead-acid battery.

Figure 1:
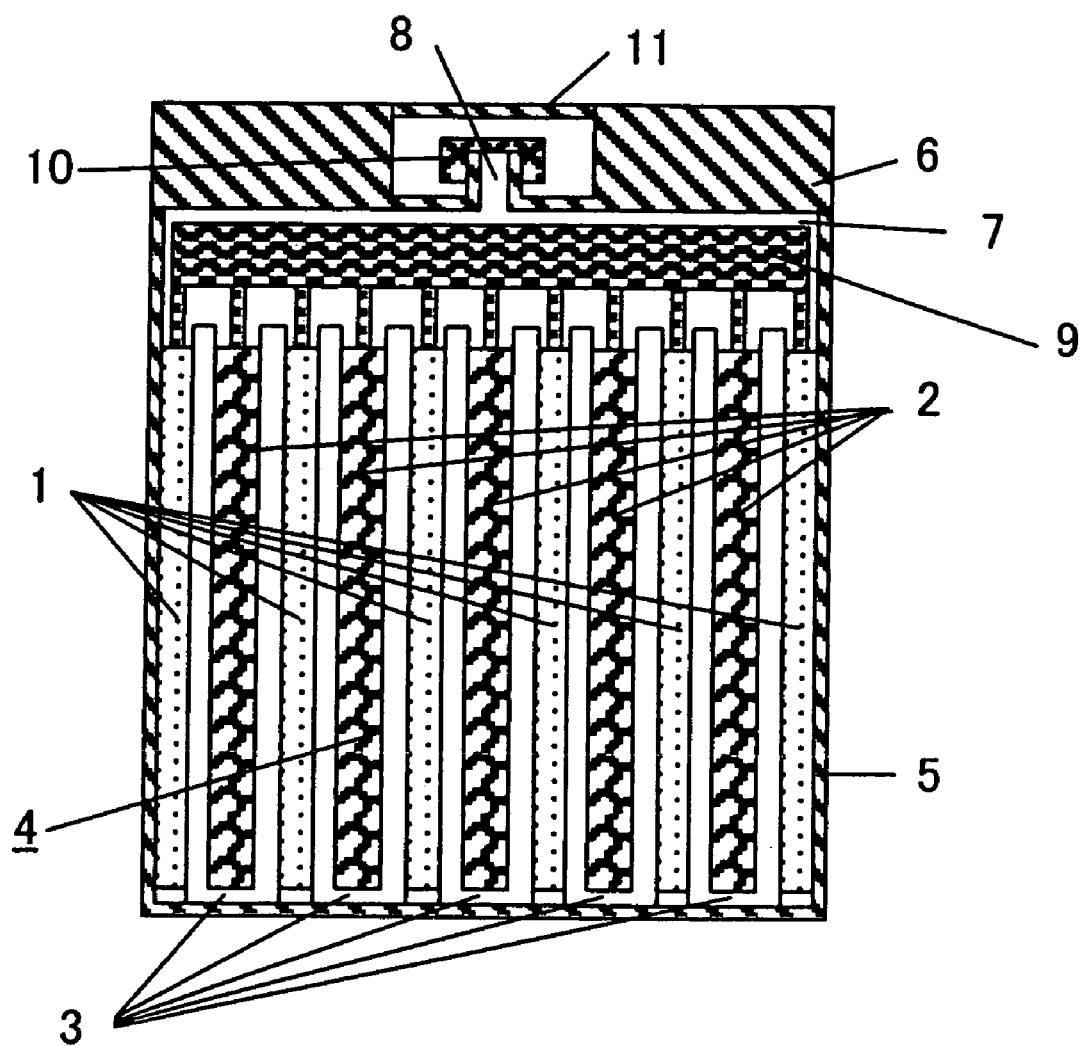
FIG. 1 is a cross-sectional view of a valve-regulated lead-acid battery according to Example of the present invention.

EXPLANATION OF REFERENCE SYMBOLS 1 a negative electrode plate
2 a positive electrode plate
3 a separator
4 an electrode plate pack
5 a container
6 a inside cover
8 an injection port
9 a strap
10 a regulator valve
11 a top cover

DETAILED DESCRIPTION OF THE PREFERRED EMBODIMENTS

Hereinafter, the present invention will be described with reference to embodiments.

FIG. 1 is a cross-sectional view of a valve-regulated lead-acid battery according to an embodiment of the invention, and 1 denotes a negative electrode plate produced by filling a negative electrode active material in a well known method in a negative electrode grid of a lead-0.065% calcium-0.5% tin alloy produced by expanding method; 2 denotes a positive electrode plate produced by filling a positive electrode active material in a well known method in a positive electrode grid of a lead-0.065% calcium-1.3% tin alloy produced by expanding method; 3 denotes a separator for wrapping the above-mentioned positive electrode plate 2 in U-shaped state; 4 denotes an electrode plate pack produced by reciprocally laminating six negative electrode plates 1 and five positive electrode plates 2 wrapped with the separator 3; 5 denotes a container made of polypropylene for housing the electrode plate unit 4; and 6 denotes an inside cover for tightly closing the container 5 after the electrode plate pack 4 is housed. Further, 9 denotes a strap for connecting the six negative electrode plates 1 and five positive electrode plates 2 composing the electrode plate pack 4 respectively in common. The above-mentioned electrode plate pack 4 is housed in the container 5 while being pressed at about 40 kPa pressure. In this case, the distance of each positive electrode plate 2 and each negative electrode plate 1 of the electrode plate pack 4 is about 0.9 mm.

The valve-regulated lead-acid battery shown in FIG. 1 is completed by housing the electrode plate pack 4 in the inside of the container 5, thereafter tightly closing the container 5 by the inside cover 6, injecting the electrolyte through an injection port 8 formed in the inside cover 6 for carrying out case formation, installing a regulator valve 10 in the injection port 8, and attaching a top cover 11 at the upper end of the inside cover 6, and to prove the above-mentioned effects of the invention, valve-regulated lead-acid batteries are produced in the following method and subjected to various tests.

Production of Valve-Regulated Lead-Acid Batteries

As the above-mentioned separator 3, following three types were prepared: a separator made of solely glass fibers with an average fiber diameter of 0.8 µm A; a separator obtained by mixing and scooping 9% by mass of acrylic fibers with an average fiber diameter of 15 µm, 6% by mass of polyester fibers, and 12% by mass of olefin fibers with glass fibers with an average fiber diameter of 0.8 µm B; and a separator obtained by dispersing a silica powder with an average particle diameter of 15 nm in a mat obtained by mixing and scooping 9% by mass of acrylic fibers with an average fiber diameter of 15 µm, 6% by mass of polyester fibers, and 12% by mass of olefin fibers with glass fibers with an average fiber diameter of 0.8 µm C. For valve-regulated lead-acid batteries using the respective separators A to C, diluted sulfuric acid with specific gravity of 1.220 was injected as an electrolyte for case formation and for other valve-regulated lead-acid batteries using B, diluted sulfuric acid mixed with silica in amounts proper to adjust the silica concentrations to be 0.3%, 0.5%, 1.0%, 1.5%, 2.0%, 3.0%, 5.0%, and 7.0% (% by mass, hereinafter the same) to the electrolyte weight after case formation was produced in such a method that the sulfate radical amount becomes equivalent to that of the diluted sulfuric acid with specific gravity of 1.220 and mixed and stirred to obtain silica sol which was injected as the electrolyte for case formation and each 5 batteries were produced. The produced batteries had voltage of 2V and initial capacity of 25 AH (5 hour rate). The silica used here was Snowtex 20 (trade name) manufactured by Nissan Chemical Industries, Ltd. The produced valve-regulated lead-acid batteries were named a for those in which A was used as the separator 3; b for those in which B was used as the separator 3; c for those in which C was used as the separator 3; $b_0$ for those in which B mixed with no silica was used as the separator 3; $b_1$ for those in which B mixed with 0.3% of silica was used as the separator 3; $b_2$ for those in which B mixed with 0.5% of silica was used as the separator 3; $b_3$ for those in which B mixed with 1.0% of silica was used as the separator 3; $b_4$ for those in which B mixed with 1.5% of silica was used as the separator 3; $b_5$ for those in which B mixed with 2.0% of silica was used as the separator 3; $b_6$ for those in which B mixed with 3.0% of silica was used as the separator 3; $b_7$ for those in which B mixed with 5.0% of silica was used as the separator 3; and $b_8$ for those in which B mixed with 7.0% of silica was used as the separator 3 (hereinafter, simply referred to as battery a, battery $b_0$, and so forth).

Charge Discharge Cycle Test

The respective valve-regulated lead-acid batteries produced in an initial lot were put in a thermostat bath at a temperature of 40° C. and subjected to a charge discharge cycle test under the conditions of easily causing discharge deficiency, in which "discharge 1→discharge 2→charge" shown in the following is defined to be 1 cycle, and the time when the discharge voltage in the discharge 2 was lowered to 1V was determined as cycle life, and the number of cycles is shown in Table 1. The number of cycles shown in Table 1 was the maximum among 5 specimens of each battery subjected to the test.

Discharge 1: discharge at constant current of 25 A for 60 seconds

Discharge 2: discharge at constant current of 250 A for 1 second

Charge: charge at constant current of 25 A for 80 seconds

Deep Discharge Cycle Test

The above-mentioned respective valve-regulated lead-acid batteries produced in the following lot were put in a thermostat bath at a temperature of 40° C. and subjected to a deep discharge cycle test under the condition of repeating the following one cycle of "discharge→standstill→charge", and the time when the discharge capacity reached 70% of the initial capacity was determined as the cycle life, and the number of cycles is shown in Table 2. The number of cycles shown in

TABLE 1

| Separator | Battery | Silica concentration in electrolyte | The number of cycles | Cause of life |
|---|---|---|---|---|
| A AGM (100% glass fiber) | a | 0% | 150,000 times | Life due to physical short-circuit |
| B Organic fiber-mixed and scooped AGM | $b_0$ | 0% | 130,000 times | Life due to penetration short-circuit |
| | $b_1$ | 0.3% | 150,000 times | Life due to penetration short-circuit |
| | $b_2$ | 0.5% | 180,000 times | Life due to penetration short-circuit |
| | $b_3$ | 1.0% | 230,000 times | Life due to electrode plate deterioration |
| | $b_4$ | 1.5% | 240,000 times | |
| | $b_5$ | 2.0% | 240,000 times | |
| | $b_6$ | 3.0% | 240,000 times | |
| | $b_7$ | 5.0% | 240,000 times | |
| | $b_8$ | 7.0% | 240,000 times | |
| C Organic fiber-mixed and scooped AGM + silica powder | c | 0% | 180,000 times | Life due to penetration short-circuit |

According to Table 1, the number of cycles until life was 100,000 times or more for all of the valve-regulated lead-acid batteries and thus all of the separators seemed to give good results, however when the respective batteries were disassembled to investigate the causes for life, it was found for the batteries a that the separator was broken and traces of short (physical short-circuit) were observed between the positive and negative electrode plates and for the batteries $b_0$, $b_1$, $b_2$, and c that traces of penetration short-circuit (dendrite short) were observed among fibers of the separators, whereas neither physical short-circuit trace nor dendrite short trace was observed in the separators of the batteries $b_3$, $b_4$, $b_5$, $b_6$, $b_7$ and $b_8$ and only traces of corrosion of positive electrode grids and dropping of positive electrode active materials supposed to result in life were observed.

Table 2 was the maximum among 5 specimens of each battery subjected to the test. In addition, as for batteries b, in order to clear a critical point at which whether penetration short-circuit occurs or not and an upper limit of an amount to be added of silica, subjects of the test were batteries $b_2$, $b_3$, $b_5$, $b_7$ and $b_8$.

Discharge: discharge at constant current of 5 A until the discharge voltage became 1.75V Standstill: for 24 hours on completion of the constant current discharge Charge: charge at constant current of 2.5 A to 130% of the discharge capacity

TABLE 2

| Separator | Battery | Silica concentration in electrolyte | The number of cycles | Cause of life |
|---|---|---|---|---|
| A AGM (100% glass fiber) | a | 0% | 400 times | Life due to physical short-circuit |
| B Organic fiber-mixed and scooped AGM | $b_0$ | 0% | 200 times | Life due to penetration short-circuit |
| | $b_2$ | 0.5% | 220 times | Life due to penetration short-circuit |
| | $b_3$ | 1.0% | 600 times | Life due to electrode plate deterioration |
| | $b_5$ | 2.0% | 610 times | |
| | $b_7$ | 5.0% | 650 times | |
| | $b_8$ | 7.0% | 650 times | |

TABLE 2-continued

| Separator | Battery | Silica concentration in electrolyte | The number of cycles | Cause of life |
|---|---|---|---|---|
| C Organic fiber-mixed and scooped AGM + silica powder | c | 0% | 220 times | Life due to penetration short-circuit |

According to Table 2, it is found that the number of cycles until life was 200 to 400 times for the batteries a having A as the separator 3, the batteries $b_0$ having B as the separator 3 and using no silica, the batteries $b_2$ having B as the separator 3 and using silica in a proper amount to adjust the mass ratio to be 0.5% of diluted sulfuric acid before case formation, and the batteries c having C, whereas the number of cycles until life was 600 times or higher for the batteries $b_3$, $b_5$, $b_7$, and $b_8$ having B as the separator 3 and using silica in proper amounts to adjust the mass ratio to be 1.0%, 2.0%, 5.0%, and 7.0%, respectively to that of diluted sulfuric acid before case formation. Further, when the respective batteries were disassembled to investigate the causes for life, it was found for the batteries a that the separator was broken and traces of short (physical short-circuit) were observed between the positive and negative electrode plates and for the batteries $b_0$, $b_2$, and c that traces of penetration short-circuit (dendrite short) were observed among fibers of the separators, whereas neither physical short-circuit trace nor dendrite short trace was observed in the separators of the batteries $b_3$, $b_5$, $b_7$ and $b_8$ and only traces of corrosion of positive electrode grids and dropping of positive electrode active materials supposed to result in life were observed.

Physical Short-Circuit Resistance Test

Figure 2A:
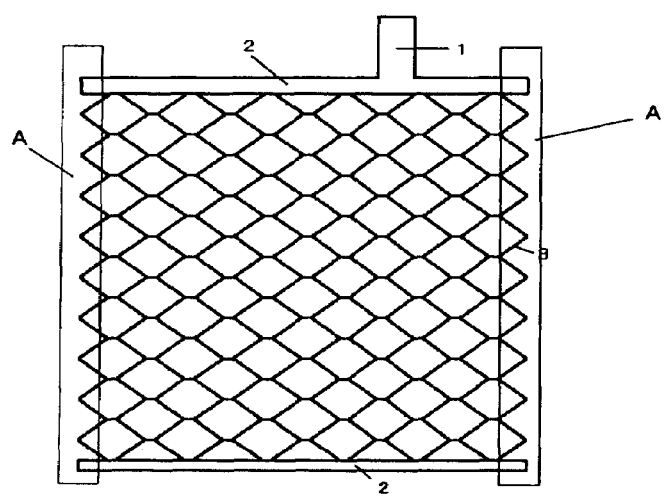
FIG. 2 is an explanatory drawing explaining a physical short-circuit resistance test.
Figure 2B:
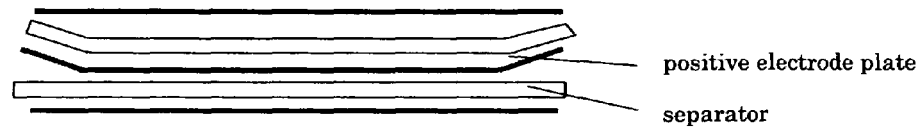
Figure 2C:
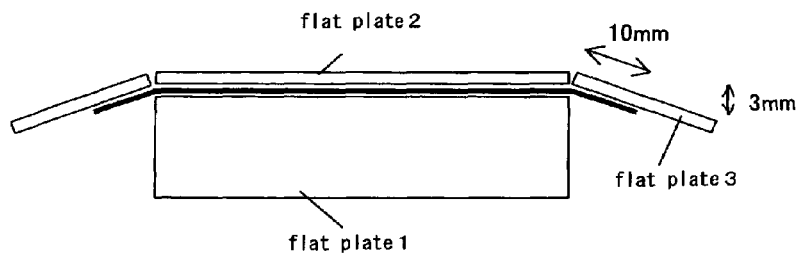

When the following ten batteries of 2 lots were produced in the same method as those in the case of the above-mentioned deep discharge cycle test, side part wires (the portions denoted as A in FIG. 2A) of the positive electrode grid of the positive electrode plate 2 positioned in the center among the five positive electrode plates 2 were bent as shown in FIG. 2B, and the batteries were subjected to the above-mentioned charge discharge cycle test and the results are shown in Table 3. The number of cycles shown in Table 3 was the maximum among 10 specimens of each battery subjected to the test. The side part wire bending was carried out, as shown in FIG. 2C, by putting a positive electrode grid on a flat plate 1 in a method that both side ends of the positive electrode grid was projected by 10 mm, further putting a flat plate 2 having a flat plate 3 to be bent in both ends thereon, and bending the flat plate 3 toward the 1 side by 3 mm.

TABLE 3

| Separator | Battery | Silica concentration in electrolyte | The number of cycles | Cause of life |
|---|---|---|---|---|
| A AGM (100% glass fiber) | a | 0% | 150,000 times | Life due to physical short-circuit |
| B Organic fiber-mixed and scooped AGM | $b_0$ | 0% | 130,000 times | Life due to penetration short-circuit |
| | $b_2$ | 0.5% | 180,000 times | Life due to penetration short-circuit |
| | $b_3$ | 1.0% | 230,000 times | Life due to electrode plate deterioration |
| | $b_5$ | 2.0% | 240,000 times | |
| | $b_7$ | 5.0% | 240,000 times | |
| | $b_8$ | 7.0% | 240,000 times | |
| C Organic fiber-mixed and scooped AGM + silica powder | c | 0% | 180,000 times | Life due to penetration short-circuit |

According to Table 3, it is found that although decay of voltage occurred on completion of case formation for the batteries a having A as the separator 3 and thereafter the batteries could not be subjected to the charge discharge cycle test, whereas number of cycles until life was 100,000 times or more for all of the batteries $b_0$ having B as the separator 3 and using no silica, the batteries $b_2$ having B as the separator 3 and using silica in a proper amount to adjust the mass ratio to be 0.5% of diluted sulfuric acid before case formation, the batteries $b_3$, $b_5$, $b_7$ and $b_8$ having B as the separator 3 and using silica in proper amounts to adjust the mass ratio to be 1.0%, 2.0%, 5.0%, and 7.0%, respectively to that of diluted sulfuric acid before case formation, and the batteries c having C as the separator 3. When the respective batteries were disassembled, in the same way as the case of the above-described charge cycle test, it was found for the batteries a that the separator was broken and traces of short (physical short-circuit) were observed between the positive and negative electrode plates and for the batteries $b_0$, $b_2$, and c that traces of penetration short-circuit (dendrite short) were observed among fibers of the separators, whereas neither physical short-circuit trace nor dendrite short trace was observed in the separators of the batteries $b_3$, $b_5$, $b_7$, and $b_8$ and only traces of corrosion of positive electrode grids and dropping of positive electrode active materials supposed to result in life were observed.

Further, when this physical short-circuit resistance test was carried out by bending side part wires of the negative electrode grids in the negative electrode plates 1 in both sides or by bending the positive electrode grid of one positive electrode plate 2, and the negative electrode grids of two negative electrode plates 1 in place of bending of the positive electrode grid of the positive electrode plate 2 positioned in the center, the same results were obtained.

Accordingly, the present invention not only improves the physical short-circuit resistance but also improves the penetration short-circuit resistance by using a separator obtained by mixing and scooping glass fibers and organic fibers as the separator 3 and adding silica in proper amounts to adjust the mass ratio to be 1.0%, 2.0%, 5.0%, and 7.0%, respectively to that of diluted sulfuric acid before case formation. However, in the case where silica is added to diluted sulfuric acid to form silica sol which is injected into the container before case formation, if the addition amount of silica is to be 5.0% or 7.0%, although injection is possible, gelation occurs within a short time after mixing the diluted sulfuric acid and silica, so that the addition amount is preferable to be 1% by mass or higher and 3% by mass or lower in consideration of the effect, cost, and workability.

Although Snowtex 20 (trade name) manufactured by Nissan Chemical Industries, Ltd. was uses as silica in the above-described Examples, different Snowtex (trade name) manufactured by the same company, or silica manufactured by other companies, for example, Aerosil (trade name) manufactured by Nippon Aerosil may be also usable. Further, in the above-described Examples, as the organic fibers mixed and scooped with glass fibers, those containing 9% by mass of acrylic fibers, 6% by mass of polyester fibers, and 12% by mass of olefin fibers were used, however these fibers may be used respectively alone, or arbitrarily selected two or more kinds may be used and it is preferable to adjust the amount of the fibers to be mixed and scooped with glass fibers in a method of adjusting the glass fibers at 60% by mass or higher in terms of the retention property of the electrolyte. In the above-described Examples, although fibers containing 85% by mass or higher and less than 100% by mass of acrylonitrile were used as acrylic fibers; fibers made of copolymers containing 90% by mass or more of ethylene terephthalate and 3% by mass or more and 8% by mass or less of ethylene glycol were used as the polyester fibers; and fibers made of ethylene polymers were used as olefin fibers, acrylic fibers, polyester fibers, and olefin fibers other than those fibers may be used.

INDUSTRIAL APPLICABILITY

As described above, the present invention can contribute to improvement of penetration short-circuit performance of a valve-regulated lead-acid battery and improve the cycle life property, and is therefore industrial applicability thereof is remarkable.

What is claimed is:

1. A valve-regulated lead-acid battery, comprising:
    an electrode plate pack having a separator inserted between positive and negative electrode plates and housed in a container, and
    an electrolyte retained in the electrode plate pack and the separator,
    wherein the separator is a mixed mat of glass fibers and organic fibers, and the electrolyte is a diluted sulfuric acid with specific gravity of 1.22 or more, a silica sol mixed with silica in an amount of 1% by mass or more and 2% by mass or less on the basis of the mass of the electrolyte, and free of gelation.

2. The valve-regulated lead-acid battery according to claim 1, wherein the organic fibers contain at least one of acrylic fibers, polyester fibers, and olefin fibers.

3. The valve-regulated lead-acid battery according to claim 1, wherein the mixed mat contains at least 60% by mass of glass fibers.

4. A method for producing the valve-regulated lead-acid battery according to claim 1, comprising:
    providing an electrode plate pack by inserting a separator between positive and negative electrode plates and housing the electrode pack in a container; and
    filling an electrolyte into the electrode plate pack and the separator, wherein silica, in an amount of 1% by mass or more and 2% by mass or less on the basis of the mass of the electrolyte, is added to the electrolyte filled into the container at the time of case formation.

* * * * *